United States Patent
Ewers et al.

(10) Patent No.: US 10,364,861 B2
(45) Date of Patent: Jul. 30, 2019

(54) VALVE ARRANGEMENT

(71) Applicant: ÖHLINS RACING AB, Upplands Väsby (SE)

(72) Inventors: Benny Ewers, Vetlanda (SE); Fredrik Larsson, Jönköping (SE); Simon Ivarsson, Jönköping (SE)

(73) Assignee: Öhlins Racing AB, Upplands Väsby (SE)

( * ) Notice: Subject to any disclaimer, the term of this patent is extended or adjusted under 35 U.S.C. 154(b) by 201 days.

(21) Appl. No.: 15/519,518

(22) PCT Filed: Oct. 12, 2015

(86) PCT No.: PCT/EP2015/073584
§ 371 (c)(1),
(2) Date: Apr. 14, 2017

(87) PCT Pub. No.: WO2016/062572
PCT Pub. Date: Apr. 28, 2016

(65) Prior Publication Data
US 2017/0241503 A1    Aug. 24, 2017

(30) Foreign Application Priority Data
Oct. 21, 2014    (EP) .................................. 14189712

(51) Int. Cl.
*F16F 9/34*    (2006.01)
*F16F 9/46*    (2006.01)

(52) U.S. Cl.
CPC .............. *F16F 9/465* (2013.01); *F16F 9/34* (2013.01); *F16F 9/466* (2013.01); *F16F 2230/24* (2013.01)

(58) Field of Classification Search
CPC .... F16F 9/50; F16F 9/465; F16F 9/466; F16F 9/34; F16F 9/342; F16F 9/344
See application file for complete search history.

(56) References Cited

U.S. PATENT DOCUMENTS 5,293,970 A * 3/1994 Schneider .............. B60G 17/08
188/266.5
5,464,079 A * 11/1995 Lohberg ................. B60G 17/08
188/280
7,654,369 B2    2/2010 Murray et al.
(Continued)

FOREIGN PATENT DOCUMENTS

CN         101025213 A    6/2011
DE         3924168 A1     1/1991
(Continued)

OTHER PUBLICATIONS

International Search Report and Written Opinion dated Feb. 9, 2016 for International Application No. PCT/EP2015/073584, in 13 pages.

*Primary Examiner* — Nicholas J Lane
(74) *Attorney, Agent, or Firm* — Knobbe, Martens, Olson & Bear, LLP

(57) ABSTRACT

A valve arrangement controls a flow of damping medium in a shock absorber. Pressurized damping fluid acts around a whole circumference of the slidable valve member and the impact of flow forces on the slidable valve member is minimized, which vastly decrease the disturbing axial forces and thereby achieves a more dependable valve arrangement with a reliable operation.

20 Claims, 6 Drawing Sheets

(56) References Cited

U.S. PATENT DOCUMENTS

| | | | |
|---|---|---|---|
| 2009/0288924 A1 | 11/2009 | Murray | |
| 2013/0313056 A1* | 11/2013 | Cox | F16F 9/48 188/285 |
| 2016/0076616 A1* | 3/2016 | Ewers | F16F 9/465 188/322.13 |
| 2016/0109034 A1* | 4/2016 | Fluhs | F16K 31/0648 251/129.15 |

FOREIGN PATENT DOCUMENTS

| | | |
|---|---|---|
| DE | 4107600 A1 | 9/1992 |
| DE | 4137403 A1 | 5/1993 |
| EP | 1820996 A2 | 8/2007 |
| EP | 1953410 A1 | 8/2008 |
| EP | 1983213 | 10/2008 |
| JP | 2014173714 A | 9/2014 |
| JP | 5952760 B2 | 7/2016 |
| WO | WO2011/040808 A2 | 4/2011 |

\* cited by examiner

VALVE ARRANGEMENT

INCORPORATED BY REFERENCE TO ANY PRIORITY APPLICATIONS

This application is a national stage application under 35 U.S.C. § 317 of PCT Application No. PCT/EP2015/073584, designating the United States, filed on Oct. 12, 2015. The PCT Application was published in English as WO2016/062572 on Apr. 28, 2016 and claims priority to European Patent Application No. 14189712.4, filed on Oct. 21, 2014. Each of the foregoing applications are hereby incorporated by reference in its entirety.

TECHNICAL FIELD OF THE INVENTION

The present invention generally relates to the field of valve arrangements. In particular, the present invention relates to a valve arrangement for controlling a flow of damping medium in a shock absorber.

TECHNICAL BACKGROUND

Generally, within the technical field of electrically controlled shock absorbers a valve arrangement is used to control a flow of damping medium between a compression chamber and a rebound chamber during a reciprocal motion of a piston in a damping medium filled chamber of the shock absorber. The piston, via a piston rod, is connected either to a wheel or a chassis, whereas the chambers are connected to one of the wheel or chassis that the piston is not connected to. During a compression stroke the piston moves axially in a direction towards the compression chamber and thereby pressurizes the damping medium in the compression chamber. During a rebound stroke, the piston moves axially towards the rebound chamber, i.e. in the opposite direction, and thereby pressurizes the damping medium in the rebound chamber. In accordance with the function of the shock absorber, the pressurized damping medium needs to be transferred from the pressurized chamber to the other chamber, i.e. from the compression chamber to the rebound chamber or vice versa. The flow of damping medium needs to be controlled to obtain a damping effect of the piston and thus the shock absorber, i.e. to damp relative motion between the wheel and chassis.

The control of the pressure in the flow of damping medium in the shock absorber may depend on the pressure created by a valve arrangement. Pressure regulators in shock absorbers may be provided with an axially movable or deflectable valve member, such as a washer, cone or shim that acts against a seat part. The pressure control is achieved by equilibrium or balance of forces, for example equilibrium between a pressure and/or flow force acting on the valve member in one direction and counteracting or opposing forces, such as one or more of a spring force, friction force or pilot pressure force acting on the valve member in the opposite direction. When the piston of the shock absorber moves at a certain speed such that the pressure and/or flow force become greater than the opposing or counteracting forces, the movable valve member is forced away from the seat part, thereby opening a flow passage. Thus, the movable valve member is forced to open at a stroke defined as a function of the flow produced by the pressure acting on the regulating area of the pressure regulator.

Some state of the art valve arrangements use a slidably arranged control valve member for regulating a flow. The regulated flow of such slidably arranged control valve members may either be the main flow, or a by-pass flow for allowing a flow parallel to the main flow between the compression and the rebound chamber.

A problem with this type of valve members, often being pressure relieved and biased by a pressure balance and/or spring arrangement valves, is that the available force for adjusting the axial position normally is low which makes them sensitive to forces acting on the valve member. Thus, such valve arrangements are very susceptible to disturbance during operation.

Therefore, there is a need for a valve arrangement for shock absorbers with increased operating reliability.

SUMMARY OF THE INVENTION

An object of the present invention is to provide an improved valve arrangement having a more reliable operation, resulting in a more dependable valve arrangement.

Above-mentioned and other objects are achieved by a valve arrangement being suitable for a shock absorber and comprising a valve housing having a first and a second port, a main valve member arranged in said valve housing and having a radial hole, and a control valve member being movable in an axial direction relative said main valve member in response to an actuating force acting on said control valve member to restrict a first damping fluid flow between said first and second port wherein said control valve member comprises at least a first radial hole and a second radial hole at an axial distance from each other being fluidly connected to each other and allowing said first flow of said damping fluid between said first and second port via said main valve member's radial hole. Moreover, the main valve member comprises a first recess at the radial inner end of said radial hole along the main valve members' inner circumference forming an outer volume for holding a damping fluid, so as to spread pressurized damping fluid flowing between said first and second port around substantially the entire circumference of the control valve member. Finally, the first flow of damping medium is controlled through the axial position of said first radial hole relative an edge of said outer volume so as to restrict the flow when reducing the orifice of said first radial hole.

The invention is based on the inventors' realization that the radial forces from the distributed pressurized damping fluid and axial forces generated by the flow velocity of the fluid acting on the slidable valve member generates both radial friction forces and axial disturbing forces which both affect the axial position of the slidable valve member. Therefore, the inventors' have invented a valve arrangement where the pressurized damping fluid acts around the whole circumference of the slidable valve member and the impact of flow forces on the slidable valve member is minimized by eliminating axial surfaces on the slidable valve member which could be influenced from locally lowering of pressure created by the increased flow velocity, which vastly decrease the disturbing axial forces and thereby achieves a more dependable valve arrangement with a reliable operation.

Thereby, an improved valve arrangement is provided which has a more reliable operation than prior art, resulting in a more dependable valve arrangement. Specifically, the pressurized damping fluid in such a valve arrangement acts around the whole circumference of the control valve member and the impact of flow forces on the control valve member is minimized by eliminating axial surfaces on the slidable valve member which could be influenced from locally lowering of pressure created by the increased flow velocity, which vastly decreases the disturbing axial forces and therefore achieves a more dependable valve arrangement with a reliable operation. Having a volume for holding the pressurized fluid so that it surrounds the whole circumference of the control valve member enables this effect by balancing the valve. Moreover, by enabling the outer volume by means of a recess in the main valve member it is possible to achieve the restriction through regulating the axial position of the control valve member relative the recess. Thereby, when the orifice area of the first radial hole in the control valve member overlaps the edge of the outer volume the damping fluid is restricted so as to control the damping effect. The more of the orifice area of the first radial hole that is axially outside of the outer volume, the more the damping fluid is restricted. The design where the first radial hole is comprised in the control valve member and the edge of the outer volume is a portion of the main valve member provides low disturbing forces. Thus, problems in prior art with forces acting on the control valve member may be overcome with a valve arrangement according to above.

In the application the wording "restrict a flow" should be interpreted as regulating a pressure and/or the flow itself. Regulating should read equivalent to controlling, e.g. by restricting or throttling the pressure and/or the flow. Moreover, when writing about a recess in "the interface between X and Y" means that the recess may be created by e.g. removing material from X or from Y, or a combination of removing material from each of the two. Moreover, a failsafe flow is defined as a flow of damping medium bypassing the main fluid flow when the actuating force is below a predetermined force. Further, it should be understood that the actuating force is provided in at least an axial direction. Moreover, although the detailed description below is consistent about which port is the first port, and which is the second port, for the inventive concept it does not matter in which direction the flow is, i.e. solely from the first port to the second port, solely from the second port to the first port or in both directions. E.g. the feature that the first radial hole is comprised in the control valve member and that the edge of the outer volume is a portion of the main valve member provides low disturbing forces in both flow directions. Thus, in the context of this document when talking about the flow, the wording "between the first and second port" does not indicate a direction of the flow. It should be understood as either direction or even both directions of the flow. Finally, the wording "hole" or "radial hole" should be understood as any type of bore, liquid line, through hole or similar. At least, the hole should allow a through flow of the damping medium. Moreover, "radial" means that the hole's extension has at least a radial component. It does not necessary mean that the hole needs to have a strict radial extension. Also, in the context of the application when writing "comprising a radial hole" it should be understood as it comprises one or more radial hole(s). That is, one radial hole does not exclude several radial holes.

According to one embodiment the main valve member is axially movably arranged in said valve housing and being arranged to interact with a main valve seat of said valve housing in order to restrict a main damping fluid flow between said first and second ports. Thereby, the main flow may be controlled by controlling the size of the opening between the main valve member and the main valve seat.

According to yet another embodiment the first damping fluid flow is a bypass flow. Thereby, the first damping fluid flow through the radial hole in the control valve member may be a bypass flow and the main flow may flow between the main valve member and the main valve seat. Thus a more fine tuned flow may be controlled by means of the axial position of the control valve member. Also, it should be understood that a bypass flow may be a bypass flow during active control of the main flow, i.e. when there is a controlled opening in the passage between the main valve member and the valve seat. A bypass flow may also include a failsafe flow where the main valve member closes against the main valve seat, so as to prevent substantially any flow of damping medium through said passage, and the only flow of damping medium between the first and second ports is through the failsafe flow. As explained above, this type of flow is desirable during malfunction of components or loss of power.

According to another embodiment the valve arrangement further comprises a pilot chamber being in fluid communication with said first and/or second port, wherein a pilot pressure is defined by a hydraulic pressure in said pilot chamber. Thereby, either one of, or both of, the main valve member and the control valve member may be controlled in response to the pilot pressure in the pilot chamber.

According to yet another embodiment the valve member interacts with a main valve seat of said valve housing in order to restrict a main damping fluid flow between said first and second ports in response to said pilot pressure acting on said main valve member. Thereby, a shock absorber having a valve arrangement being controlled in response to the pilot pressure may be provided. A pressure regulated valve arrangement will obtain damping characteristics which is superior to a strictly orifice controlled valve. In an orifice controlled valve, the pressure will increase exponentially as a function of the flow, whereas a pressure regulated valve member may regulate the flow in a more linear relation relative the pressure. This is a great advantage when for e.g. implementing the valve arrangement in a shock absorber for a vehicle.

According to another embodiment the second axial hole is a failsafe hole for controlling a failsafe flow of said damping medium. Thereby, the total orifice area of the second axial hole(s) can be sized and arranged to allow a suitable failsafe flow of damping medium if any of the components in the valve arrangement malfunctions or power is lost. By varying the number of holes, or more correctly, the total orifice area of the second axial hole(s), the restriction may be set to allow a suitable failsafe flow for the application in which the valve arrangement is implemented in.

According to yet another embodiment the valve arrangement further comprises a second recess in the interface between said main valve member and said control valve member, axially displaced from said first recess towards said first port and extending along the main valve members' inner circumference forming an inner volume for holding a damping fluid, so as to spread pressurized damping fluid flowing between said first and second port around substantially the entire circumference of the control valve member. Thereby, the second axial hole may present a fully open orifice area towards the second volume throughout a predefined range of axial positions of the control valve member relative the main valve member. The second volume thus provides flow capacity for flow of the damping medium between the second axial hole and the main valve member's radial hole without requiring a specific axial position of the control valve member relative the main valve member. Moreover, this is achieved regardless of the flow direction, i.e. from the first port to the second port or from the second port to the first port.

According to another embodiment the total orifice area of the first radial holes is at least the same size as, or larger than, the total orifice area of the second radial holes in said control valve member. Thereby, the total orifice area of the first radial hole(s) will not constitute a throttling during failsafe operation. In one embodiment the ratio between the total orifice area of the first radial holes and total orifice area of the second radial holes in said control valve member is about 2:1. In one embodiment, the orifice area of each first and second radial hole in the control valve member is about the same, and the total orifice area is configured by means of the number of holes; e.g. there may be two first radial holes and one second radial hole, four first radial holes and two second radial holes, or six first radial holes and three second radial holes, all with the same orifice area.

According to yet another embodiment the control valve further comprises a third set of radial holes arranged axially between said first and second radial holes so that when said control valve member is in an axial fail safe position the damping fluid is restricted by the orifice area of the second radial hole(s) towards the first port and by the total orifice area of the first and third radial holes towards the second port. Thereby, the third radial holes will function as capacity holes so that the total orifice area of the first radial hole(s) will not constitute a limitation for flow in failsafe mode, since their orifice area is complemented by the orifice area of the third radial holes acting as capacity holes. Thus, the throttling in failsafe mode is solely controlled by the orifice area of the second radial hole(s).

According to another embodiment the control valve further comprises a set of third radial holes arranged axially between said first and second radial holes so that when said control valve member is in an axial active regulating position the damping fluid is restricted by the orifice of the first radial hole(s) towards the second port and by the total orifice of the second and third radial holes towards the first port. Thereby, the third radial holes will function as capacity holes so that the total orifice area of the second radial hole(s) will not constitute a limitation for the bypass flow in regulated operation, since their orifice area is complemented by the orifice area of the thirds radial holes acting as capacity holes. Thus, the throttling of the bypass flow during regulated operation is solely controlled by the orifice area of the first radial hole(s).

According to yet another embodiment the total orifice area of the third radial holes is larger than the total orifice area of said first or second radial holes. Thereby, the third radial holes will function as capacity holes so that only the first or second (depending on what operation mode) radial holes restrict the bypass flow. With other words, during regulated operation only the first radial holes will restrict the bypass flow, and during failsafe operation only the second radial hole(s) will restrict the bypass (failsafe) flow.

In one embodiment the control valve comprises at least three third radial holes. In one embodiment the control valve comprise between two and eight holes. Thereby, the damping flow can easily flow through several holes through the circumference of the control valve member.

According to yet another embodiment wherein, when said control valve member is held against an axial stop, the control valve member closes the pilot chamber so as to build up an enclosed pressure in the pilot chamber which holds the main valve member against said main valve seat and thereby keeps the main flow closed between said first and second ports.

By having an axial stop which restricts the axial movement of the control valve member, the control valve member may be brought into a failsafe position without an exact precision. Thereby the control valve member may be held against an axial stop during fail safe operation with less exact requirements of that the free length of the biasing member is exactly configured. Thus, although the free length of the biasing member varies either e.g. over time due to aging or due to differences in installation or production, the same effect may be achieved. Moreover, the built up pressure can hold the main valve member in a closed position, resulting in that the only flow is the fail safe flow through the second radial hole(s), thus the valve arrangement ensures that the main flow is closed so as to avoid a substantially unrestricted flow of hydraulic fluid between said chambers and consequently substantially no damping force.

According to another embodiment the enclosed pressure in the pilot chamber further holds the control valve member against said axial stop. Thereby, the control valve member is also held against the stop by the enclosed pressure, allowing a dependable valve arrangement. In one embodiment, the control valve member is held by using differential areas on both sides on the pilot seat and releasing the pressure thru the pilot stage.

According to yet another embodiment the actuating force acting on said control valve member is generated by a solenoid. Thereby the control valve member may be movable in the axial direction relative the main valve member in response to an electric current. For example, the actuating force may be transmitted by an actuating rod which may have a magnetic member on which a solenoid exerts a force in response to the electric current.

According to another embodiment the valve arrangement further comprises a pilot valve member axially movable within said control valve member, said pilot valve member being arranged to interact with a pilot valve seat of said control valve member to restrict a pilot fluid flow out from said pilot chamber. Thereby, the pilot pressure may be controlled by adjusting the axial position of the pilot valve member relative the control valve member, resulting in an adjustment of the opening between the pilot valve member and the pilot valve seat to allow higher or lower flow of damping fluid.

According to yet another embodiment the first radial hole is fluidly connected with said second radial hole by means of a recess in the interface between said control valve member and said pilot valve member creating an inner volume for holding damping fluid. The inner volume may be achieved by creating a recess in the control valve member and/or the pilot valve member, so that the flow from the first radial hole to the second radial hole is allowed through said volume. In one embodiment the third radial holes are also fluidly connected to the inner volume. Thereby, all flow through the radial holes flows via the inner volume.

According to another embodiment the outer volume of said main valve member further spread pressurized damping fluid flowing from said first port to said second port around substantially the entire circumference of the control valve member.

Further features of, and advantages with, the present invention will become apparent when studying the appended claims and the following description.

The skilled addressee realize that different features of the present invention may be combined to create embodiments other than those described in the following, without departing from the scope of the present invention.

BRIEF DESCRIPTION OF THE DRAWINGS

Further details and aspect of the present invention will become apparent from the following detailed description with reference to accompanying drawings, in which.

DETAILED DESCRIPTION OF EMBODIMENTS

Figure 1:
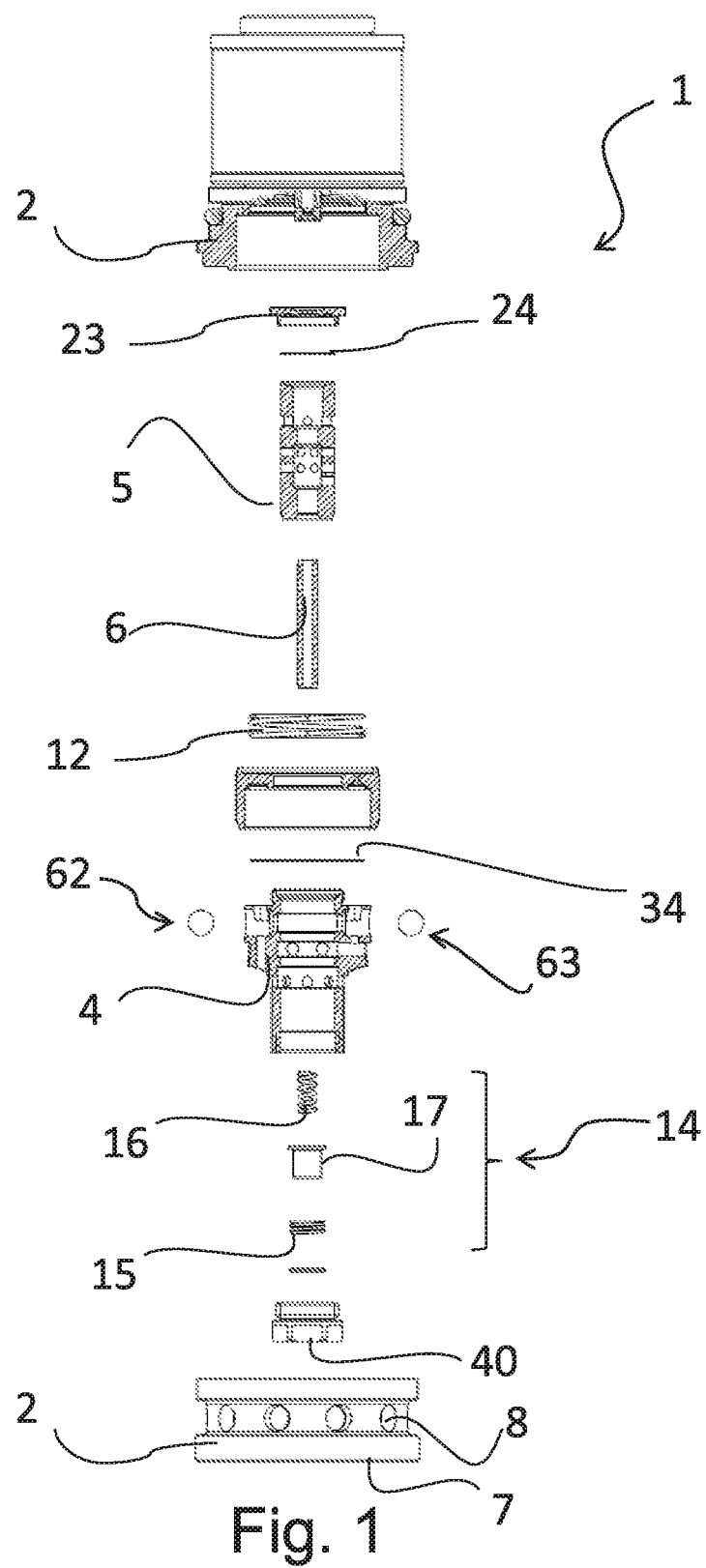
FIG. 1 shows an exploded view of an embodiment of the valve arrangement

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 2:
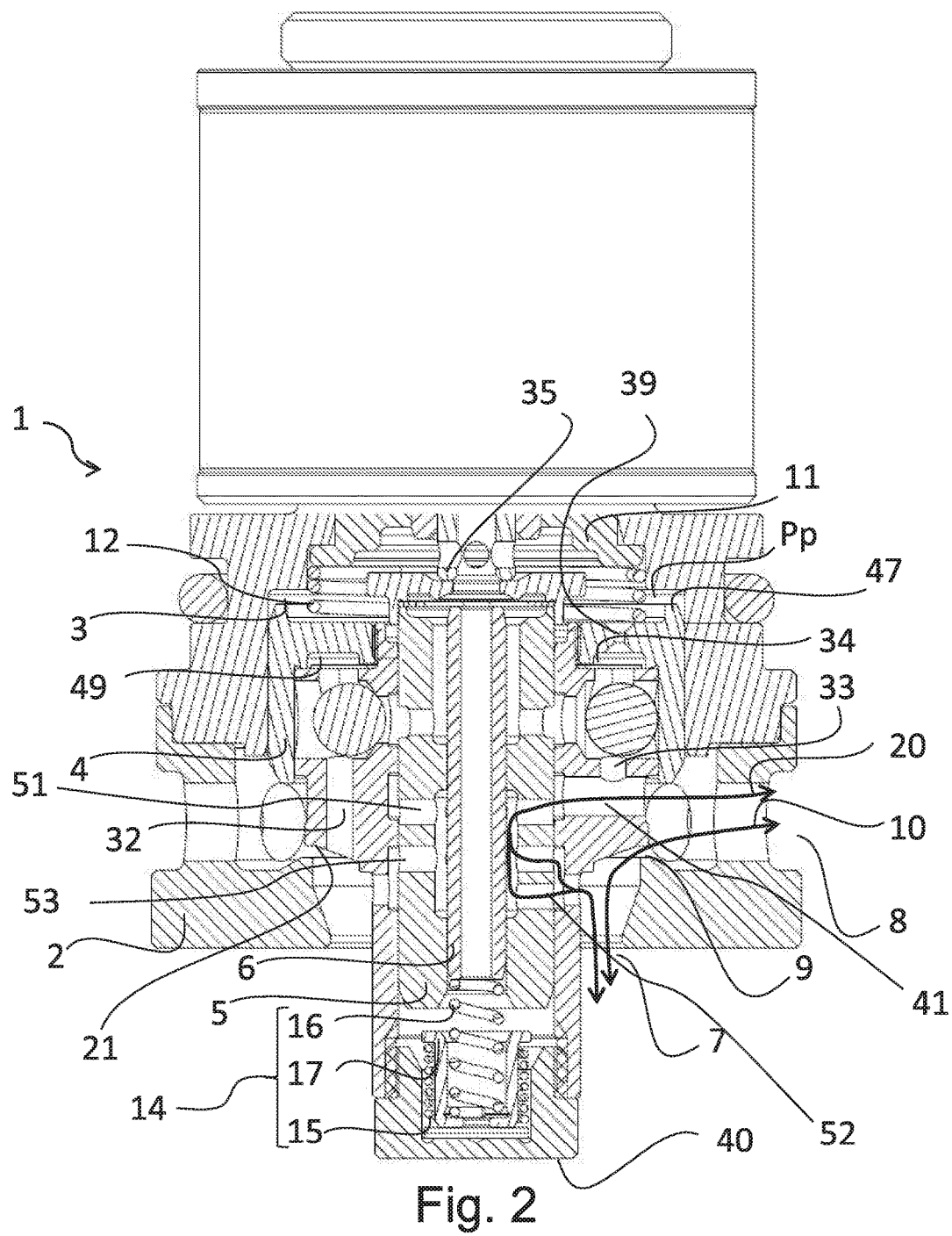
FIG. 2 shows a cross-section of an embodiment when the main valve member is in a partly open position to allow a regulated main flow from the first port to the second port, and a bypass flow through the control valve member.
Figure 3A:
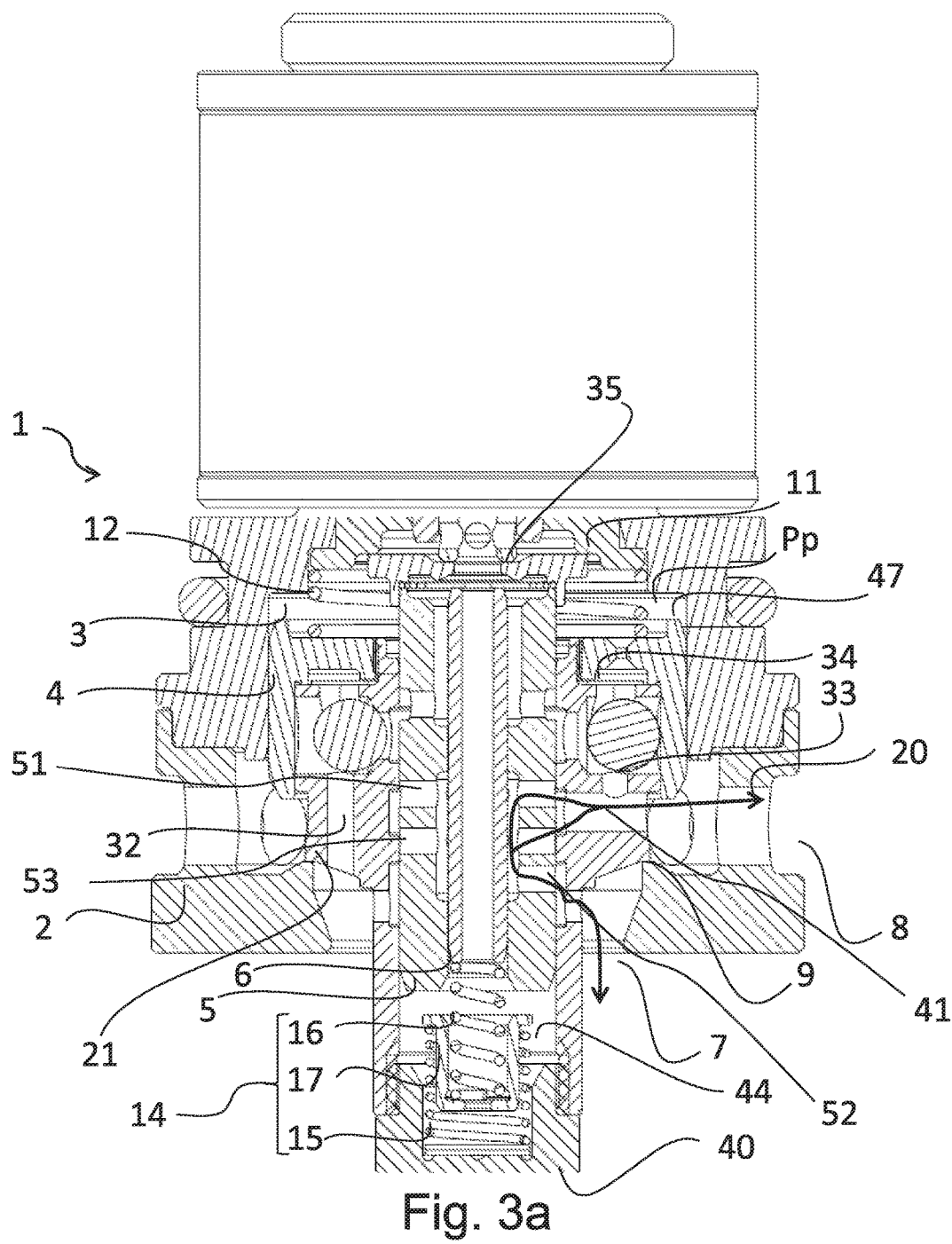
FIG. 3a shows a cross-section of an embodiment, where the main valve member is in a closed position to block a main flow from the first port to the second port, and the control valve is in a failsafe axial position, so as to allow a failsafe flow of damping medium.
Figure 3B:
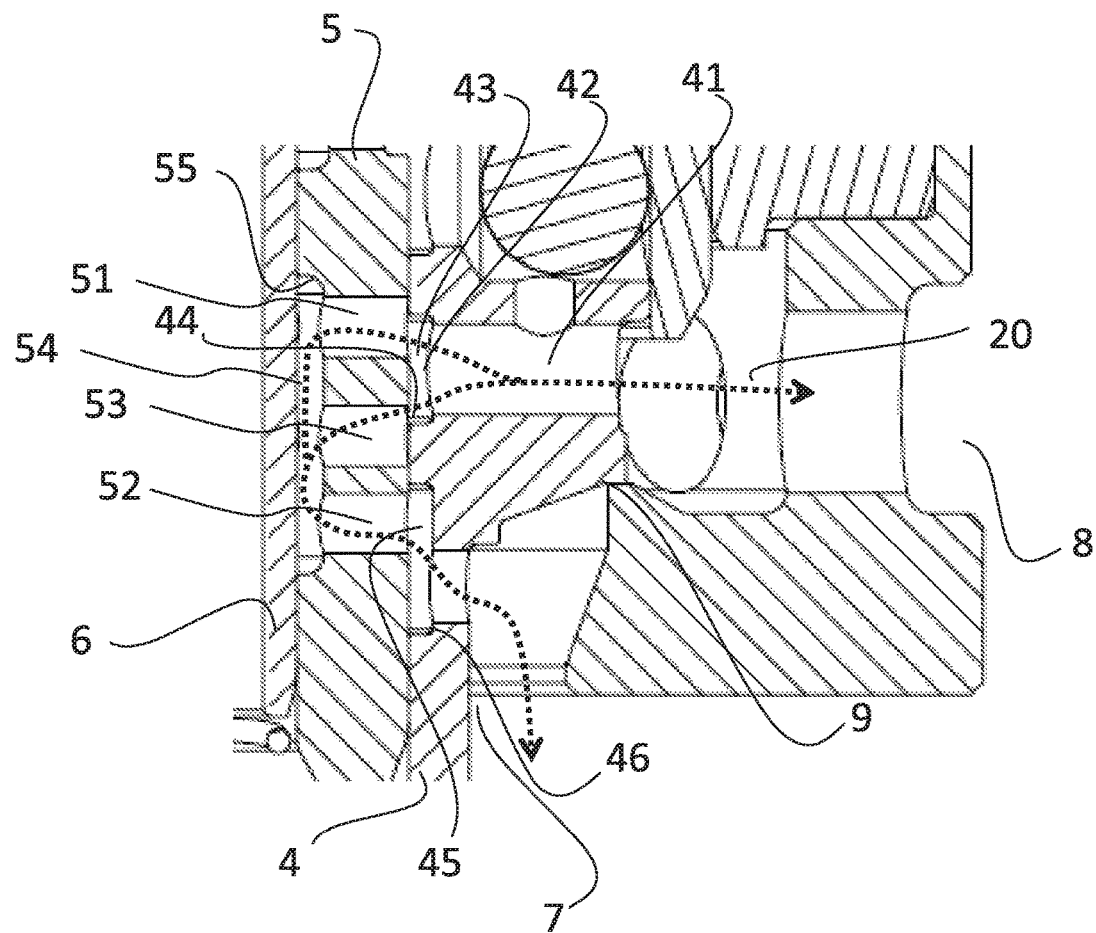
FIG. 3b is a close-up of the failsafe flow as illustrated in FIG. 3a, FIG. 4 shows a cross-section of an embodiment when the flow through the control valve member is also the main flow from the first port to the second port.
Figure 4:
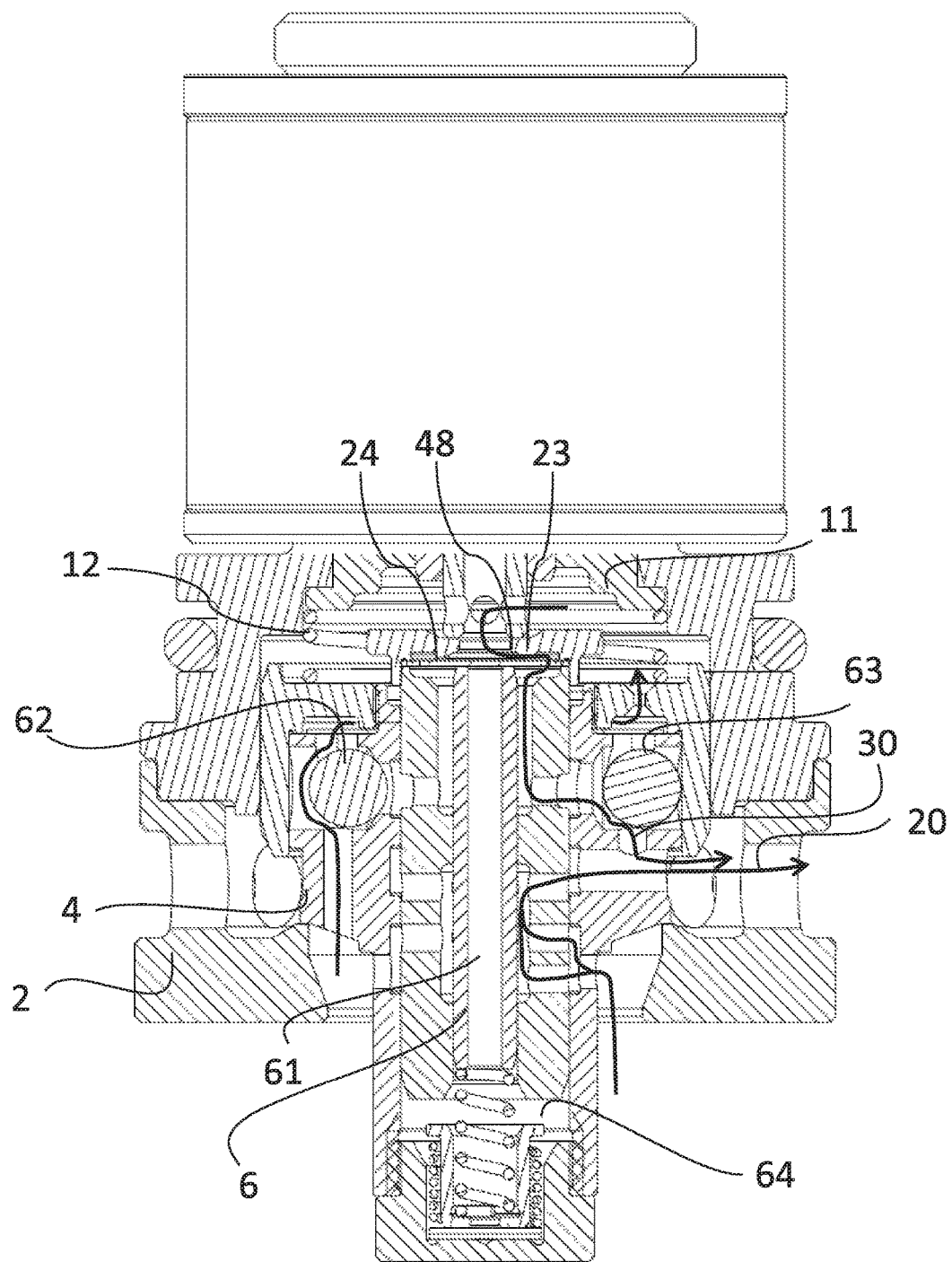
Figure 5:
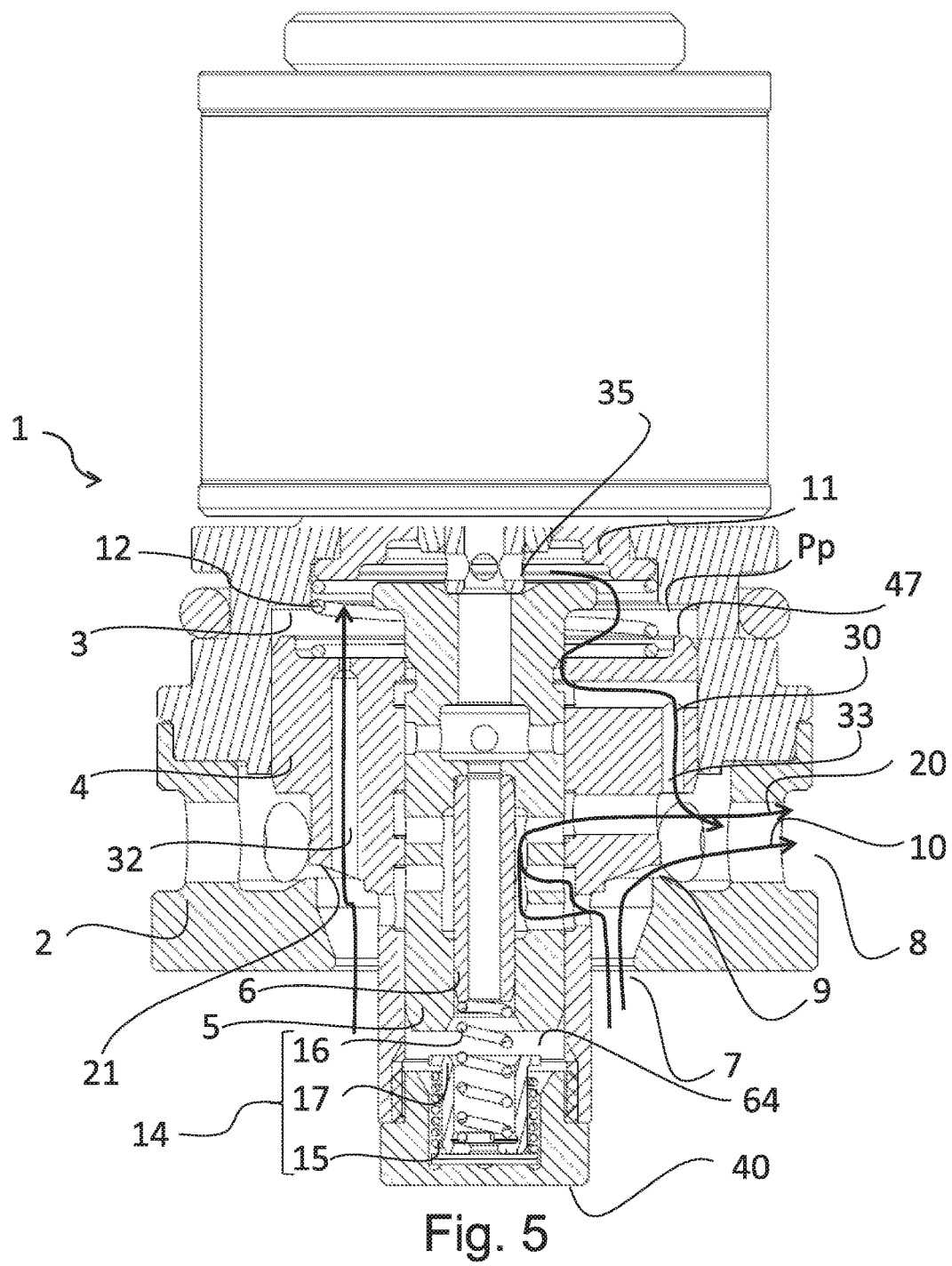
FIG. 5 shows a cross-section of an embodiment when the valve assembly is a one-way valve assembly and the main valve member is in a partly open position to allow a regulated main flow from the first port to the second port, and a bypass flow through the control valve member.

In the following, the valve arrangement is in the embodiments illustrated in FIG. 2-4 are configured for restricting fluid flows in both directions between the first and second ports. However, the concept is equally applicable in a one-way flow valve arrangement as is illustrated in FIG. 5. Moreover, although the embodiments in the figures only show valve arrangements with a pilot valve member 6, the invention is equally relevant for valve arrangements without a pilot valve member 6, wherein the pilot pressure is regulated by means of the control valve member or another valve member. Moreover, the "first flow 20" is to be understood as the flow through the control valve member, regardless if it is a bypass flow (including a failsafe flow) or a main flow. Moreover, the "second flow 10" is referred to any flow of the damping medium between the main valve member 4 and the main seat 9 of the valve housing 2.

FIG. 1 shows a cross-sectional exploded view of a valve arrangement. The valve arrangement 1 comprises a valve housing 2 (with an upper and a lower portion), a main valve member 4, a control valve member 5 and a pilot valve member 6. The figure further illustrates several details of an embodiment of the valve arrangement such as one-way valves 62, 63 and biasing means 14. However, these details will be further explained in relation to FIGS. 2-5, where their respective function also will be described. Instead, FIG. 1 is mainly included in the application to clarify the form of each component and thereby facilitate the reading and understanding of the application.

FIG. 2 shows a cross-sectional view of a first embodiment of a valve arrangement. The valve arrangement 1 comprises a valve housing 2, a pilot chamber 3, a main valve member 4, a control valve member 5, and a pilot valve member 6. As explained above, the pilot valve member is not necessary for the inventive concept. The valve housing 2 comprises a first and a second port 7, 8. In the illustrated embodiment, the first and second ports act as inlet and outlet ports, respectively, for inlet and outlet of hydraulic fluid. The main valve member 4 in FIG. 2 is axially movably arranged in the valve housing 2 and is arranged to interact with a main valve seat 9 of the valve housing in order to restrict (or regulate a pressure) in a main fluid flow 10 between the first port 7 and the second port 8 in response to a pilot pressure Pp acting on an upper surface 47 of the main valve member 4. In this embodiment, the main valve member 4 is resiliently loaded towards the main valve seat 9 towards a closed position by a main helical spring member 12 acting on the upper surface 47 of the main valve member. In other embodiments, the main valve member may be resiliently loaded by other types of spring members or may be flexible and/or resilient itself to achieve the desired resilient loading. As will be further explained in relation to FIG. 4, the main valve member 4 does not have to be axially movably arranged relative the valve housing 2 to interact with the main valve seat 9 in order to restrict (or regulate a pressure) in the a main fluid flow. Instead it is fully possible that the flow path of the bypass flow 20 is in fact also the main flow. That is, the main flow of the damping medium may also be controlled by adjusting the relative axial position of the control valve member 5 in relation to the main valve member.

Further, the control valve member 5 is resiliently loaded towards an axial stop 11 relative said main valve member by a biasing means 14. In the illustrated embodiments the biasing means comprises a first failsafe spring 15 member and a biasing spring 16 member arranged in series with a spring base member 17 there between. The spring stiffness of the failsafe spring 15 member may be, as in the illustration, lower than the stiffness of the biasing spring member 16, such that the spring base member 17 is inoperable during normal operation, i.e. when an actuating force is received. The spring base member 17 may rest against a seat portion of the main valve member 4 during normal operation, and may be released from the main valve member during failsafe operation (as shown in FIG. 3). During failsafe operation the failsafe spring member 15 and the biasing spring member would then act together in series to force the control valve member to the failsafe position against the axial stop. In other embodiments (not shown) the biasing means 14 may comprise a single spring acting on the pilot valve member or the control valve member. The axial stop may be formed in basically any way preventing the control valve member from moving axially past the axial stop. The axial stop as illustrated is formed so that a substantially flat surface of the main valve housing 2 interacts with a substantially flat top surface of the control valve member. Thereby, wear on the respective surfaces is limited as the contact area is relatively large.

The pilot chamber 3 is defined by the space formed between the upper surface 47 of the main valve member and inner walls of the valve housing 2. The pilot chamber 3 is in fluid communication with the first port 7 via a first axial through hole 32 in the main valve member 4 and with the second port 8 via a second axial through hole 33 in the main valve member 4. In the illustrated embodiment, a disc- or plate-shaped one-way valve member 34 which is flexible or deflectable, or solid and moveable, in the axial direction is arranged in a cavity 49 as a part of the main valve member to cover the axial through holes 32 and 33, thereby forming one one-way valve to allow hydraulic fluid flow through the first axial through hole 32 solely in the direction from the first port to the pilot chamber 3 via one common pilot inlet hole 39, and one one-way valve to allow hydraulic fluid flow through the second axial through hole 33 solely in the direction from the second port to the pilot chamber 3 via one common pilot inlet hole 39. In other embodiments, the one-way valves may be of another type, for example of the ball-valve type. The pilot pressure Pp acting on the upper surface 47 of the main valve member 4 is defined by a hydraulic pressure in the pilot chamber 3.

The control valve member 5 is of a substantially cylindrical shape and is arranged coaxially with and partially within the main valve member, and extends above the upper surface 47 into the pilot chamber 3. The control valve member 5 is furthermore movable in an axial direction relative the main valve member 4 in response to an actuating force acting on the control valve member. In this embodiment, the actuating force is received by an actuating rod 35. The actuating rod may be an axially movable magnetic member on which a solenoid exerts a force in response to an electric current.

Moreover, the main valve member presents an outer volume 43 between the control valve member 5 and the main valve member 4. As discussed in the summary above, the outer volume 43 enables the pressurized damping fluid to act around the envelope surface of the control valve member 5 and the impact of flow forces on the control valve member 5 is minimized, which vastly decrease the disturbing axial forces and therefore achieves a more dependable valve arrangement 1 with a reliable operation.

Further in FIG. 2, the hydraulic pressure in the first port 7 acting on the lifting area 21 of the main valve member 4 is large enough to overcome the opposing forces of the main helical spring member 12 and the pilot pressure Pp acting on the main valve member. The lifting area 21 may also include the bottom surface 40 of the main valve member.

Further, the main valve member 4 is in a partly open position in FIG. 2 so as to allow a regulated main fluid 10 flow between the first port and the second port (in either or both directions), and a bypass flow 20 through the control valve member 5. These two flows are present during active control operation of the valve arrangement. The control of flow is carried out by means a solenoid exerting an actuating force via an actuating rod 35 on the control valve member 5, and thereby regulating the flow of damping medium between the two ports 7, 8. More specifically, the control valve member 5 comprises a set of first radial holes 51 and a second radial hole 52. The first and second radial holes are arranged at an axial distance from each. Moreover, they are fluidly connected to each other by means of an inner volume 54 and fluidly connected to recesses 42, 45 in the main valve member so as to allow the first flow 20 of the damping fluid between the first and second ports 7, 8 via a radial hole 41 in the main valve members. In FIG. 2, this flow is a bypass flow, but it can also be the main flow as illustrated in FIG. 4, where the main valve member is held against (or even mounted to or a part of) the valve housing 2.

The first radial holes 51 are through holes, and may be bores, having an orifice area which is smaller than the first recess 42 of the main valve member 4. Thereby, the control valve member 5 may be axially displaced so that only a part of the orifice of its first radial holes 51 is open towards the main valve member's radial hole 41. Thereby, a restriction (or regulation of pressure) may be achieved between an edge 44 of the outer volume 43 against the first radial holes 51.

The first recess 42 in the main valve member is arranged at the radial inner end of its radial hole 41 along the main valve members' inner envelope surface forming the outer volume 43 for holding the damping fluid so as to spread the pressurized damping fluid flowing between the first and second ports 7, 8 around substantially the entire envelope surface of the control valve member 5.

Moreover, the control valve member(s) illustrated in the figures comprise a third set of radial holes 53. These radial holes 53 are arranged axially between the first and second radial holes 51, 52. They function as capacity holes so that when the control valve member 5 is in an axial active regulating position the damping (as shown in FIG. 2, 4, 5) the fluid is restricted by the orifice of the first radial holes 51 towards the second port 8 and by the total orifice of the second and third radial holes 52, 53 towards the first port 7. This makes it possible to restrict the bypass flow 20 ranging from fully opened orifices of the first radial holes 51 to zero. Although a valve arrangement 1 may function well without the third "capacity" radial holes, the total orifice of the second "failsafe" radial hole(s) would then limit the upper capacity level of the bypass flow, which is not optimal.

Correspondingly, as illustrated in FIGS. 3a and 3b, when the control valve member 5 is in an axial fail safe position the damping fluid is restricted by the orifice area of the second radial "failsafe" hole(s) 52 towards the first port 7 and by the total orifice area of the first and third radial holes 51, 53 towards the second port 8.

As mentioned above, the first flow 20 (regardless of if it is a bypass flow as in FIG. 2 or a main flow as in FIG. 4) of damping medium is controlled through the axial position of said first radial hole 51 relative the edge 44 of the outer volume 43 so as to restrict the flow when reducing the opened orifice of said first radial hole 51.

The relationship between the total orifices of the first, second and third radial holes may differ in different application. But generally, the total orifice of the third radial holes 53 would be largest, followed by the total orifice of the first radial holes 51 and the total orifice of the second radial holes 52 would be smallest. Thereby, the "capacity holes" have the largest total orifice area, the "failsafe" holes have the smallest total orifice area and the total orifice area of the "bypass flow" is somewhere there between.

In FIGS. 3a and 3b the main valve member 4 is in a closed position to block the main flow 10 between the first and second port 7, 8, and the control valve 5 is in a failsafe axial position, wherein above-mention bypass flow is a failsafe flow 20 of damping medium. During this operation mode the second axial hole 52 (or holes) functions as failsafe hole(s) for controlling the failsafe flow 20. In the illustrated example, only one second axial hole 52 is visible. However, there may be several "failsafe holes" spread along the envelope surface of the control valve member 5.

As discussed earlier, the valve arrangement 1 is designed to allow this operation mode in the case when no actuating force (from the rod 35) is received is illustrated, i.e. for example when there is electrical or mechanical malfunction to the actuating system. Since no actuating force is received, the biasing spring member 14 (in the figures, the failsafe spring 15 together with the biasing spring 16) forces the pilot valve member 6 and thereby the control valve member 5 upwards to the illustrated failsafe position, in which failsafe position the flow path from the pilot restriction to the second port 8 is closed and the bypass restriction, or more specifically failsafe restriction, is open to achieve a predetermined restriction on the bypass fluid flow 20. The opening, as more clearly illustrated in FIG. 3b is constituted by the second radial hole(s) 52, and more accurate by the total orifice area of the second radial hole(s). In this mode the third radial holes 53 function as capacity holes. Moreover, as illustrated in the figures, the valve housing 2 comprises an axial stop 11 which is sized and adapted for preventing the control valve member 5 from moving axially past the axial stop in the biasing direction. This design makes the failsafe position of the control valve member 5 very reliable, as there is a geometrical stop for the axial movement which the biasing spring member 14 can hold the control valve member against. In the failsafe position, the control valve member 5 is held against the axial stop 11 and thereby the control valve member 5 closes the pilot chamber 3 so as to build up an enclosed pressure in the pilot chamber 3 which holds the main valve member 4 against the main valve seat 9 and thereby keeps the main flow 10 closed between said first and second ports 7, 8. Consequently, hydraulic fluid is prevented from leaving the pilot chamber and the pressure of the hydraulic fluid in the pilot chamber 3 will prevent the main valve member 4 from being released or lifted from the main valve seat 9. In the failsafe position, the overall flow between the first and the second port is thus determined solely by the predetermined restriction on the bypass fluid flow 20 defined by the total orifice area of the second radial hole(s). Thus, the axial position of the control valve member relative the main valve member does not constitute the actual restriction, but instead the restriction is decided by the total orifice area of the second radial holes 52.

FIG. 4 shows a cross-section of an embodiment of the valve arrangement 1 when the first flow 20 is the main flow of the damping medium. In this embodiment, an actuator force is acting on the control valve member 5 so as to restrict the first flow 20. Moreover, the main valve member 4 and the valve housing 2 are held in a contact position to prevent any other flow than the first flow 20 between the first 7 and second 8 port. The main valve member 4 and the valve housing may be formed by the same piece of material, fastened together or simply held together by a strong enough biasing means 12.

In all the illustrated embodiments the pilot valve member 6 is substantially cylindrical in shape and is axially movable within the control valve member relative the main valve member 4 and relative the control valve member 5. The upper end of the pilot valve member comprises an upper portion 48 which is arranged to interact with an annular pilot valve seat 23 of the control valve member to restrict a pilot fluid flow 30 out from the pilot chamber to the second port 8. The pilot valve member 6 is resiliently loaded towards the pilot valve seat relative said main valve member by a biasing means 14, in this embodiment being a spring member. Since the pilot valve seat 23 is a portion of the control valve member 5, the pre-tension on the resilient loading on the pilot valve member is adjustable by axial movement of the control valve member 5 in response to the actuating force.

Moreover, the illustrated embodiment in FIG. 4 comprises an intermediate pilot valve member 24 arranged between said pilot valve seat 23 and said pilot valve member 6. The intermediate pilot valve member 24 is resiliently loaded towards said pilot valve member in a direction away from said pilot valve seat 23. The intermediate pilot valve member 24 is furthermore provided with an orifice or through hole to restrict a hydraulic fluid flow there through between the pilot chamber and the damping volume via the through hole 61 in the pilot valve member 6. The orifice or through hole has an effective flow area to form a damping flow restriction arranged to restrict fluid flow between the damping volume and the pilot chamber such that relative movement between the main valve member and the control valve member is hydraulically damped.

The pilot pressure Pp may thereby be determined by a balance between the incoming fluid flow from the first port 7 to the pilot chamber 3 and the outgoing pilot fluid flow from the pilot chamber to the second port 8 (or the other way around depending on the flow direction), the latter being determined by the pilot restriction. The pilot pressure Pp will act on the upper end of the pilot valve member to exert a downwardly directed pressure force which will act to open the pilot valve. The effective flow area of the pilot restriction is determined by the stroke of the pilot valve member relative the pilot valve seat. This stroke is determined by a balance between the pressure force and the counteracting spring force from the biasing spring member 14 (and the intermediate pilot valve member 24 when present). The pilot restriction is thus of the pressure-regulating type. As mentioned above, the pre-tension of the biasing spring member is adjustable in response to the actuating force.

Moreover in FIG. 4 it is further illustrated that the space formed between the lower end of the control valve member 5 and the inner surface of the cup-shaped lower end of the main valve member 4, i.e. just above the bottom surface 40 of the main valve member 4, defines a damping volume 64. The pilot valve member 6 has a through hole 61 extending in the axial direction there through for fluid communication between the damping volume 64 and the pilot chamber 3. The axial through hole 61 also results in that essentially the same pressure acts on both axial end surfaces of the pilot and control valve members, thereby eliminating the need for the actuating force to overcome a force resulting from a pressure difference over the control valve member.

Moreover, in all embodiments illustrated in FIG. 2-4, the valve arrangements comprise two one-way valves 62, 63 of the ball-valve type. The one-way valves may be of any type of one-way valves such as shims valves etc. The one way valves 62, 63 are arranged in the pilot flow path to allow fluid flow solely in one direction from the pilot chamber 3 to the first port 7 or second port 8. The two one-way valves 62, 63 together form a directional valve arrangement ensuring that the pilot fluid flow flows to the port in which the hydraulic pressure is the lowest. Thereby, the valve arrangement may be used in a two-way valve arrangement. It is understood that the ball of the first one of the one-way valves is held in closed position by the pressure difference over the pilot restriction, and that the ball of the other one-way valve is moved to an open position by the pilot fluid flow. Thus, the two one-way valves work independently of each other, but in response to the same pressures and pressure differences to achieve the desired directional valve functionality.

However, the inventive concept is equally applicable to a one-way valve arrangement, which is illustrated in FIG. 5 which shows a cross-section of an embodiment when the valve assembly is a one-way valve assembly and the main valve member is in a partly open position to allow a regulated main fluid flow 10 from the first port 7 to the second port 8, and a bypass flow 20 through the control valve member 5. The valve arrangement in FIG. 5 is in an active control operation which can be compared to the operation of the valve arrangement in FIG. 2. The restriction on the main fluid flow 10 is adjustable by adjusting the pilot pressure by adjusting the restriction on the pilot fluid flow 30 from the pilot chamber to the second port. This adjustment is achieved by adjusting the actuating force acting on the control valve member 5. The restriction of the main fluid flow 10 is thus of the pressure regulating type.

Although exemplary embodiments of the present invention have been shown and described, it will be apparent to the person skilled in the art that a number of changes and modifications, or alterations of the invention as described herein may be made. Thus, it is to be understood that the above description of the invention and the accompanying drawing is to be regarded as a non-limiting example thereof and that the scope of the invention is defined in the appended patent claims.

The invention claimed is:

1. A valve arrangement for a shock absorber, said valve arrangement comprising:
   a valve housing comprising a first and a second port;
   a main valve member arranged in said valve housing and having a radial hole; and
   a control valve member being movable in an axial direction relative said main valve member in response to an actuating force acting on said control valve member to restrict a first damping fluid flow between said first and second port,
   wherein said control valve member comprises at least a first radial hole and a second radial hole at an axial distance from each other being fluidly connected to each other and allowing said first flow of said damping fluid between said first and second port via said main valve member's radial hole,
   wherein said main valve member comprises a first recess at the radial inner end of said radial hole along the main valve members' inner circumference forming an outer volume for holding a damping fluid, so as to spread pressurized damping fluid flowing between said first and second port around substantially the entire circumference of the control valve member, and
   wherein said first flow of damping medium is controlled through the axial position of said first radial hole relative an edge of said outer volume so as to restrict the flow when reducing the orifice of said first radial hole,
   wherein said main valve member is axially movably arranged in said valve housing and being arranged to interact with a main valve seat of said valve housing in order to restrict a main damping fluid flow between said first and second ports.

2. The valve arrangement according to claim 1, wherein said first damping fluid flow is a bypass flow.

3. The valve arrangement according to claim 1, wherein said valve arrangement further comprises a pilot chamber being in fluid communication with said first and/or second port, wherein a pilot pressure is defined by a hydraulic pressure in said pilot chamber.

4. The valve arrangement according to claim 3, wherein the main valve member interacts with a main valve seat of said valve housing in order to restrict a main damping fluid flow between said first and second ports in response to said pilot pressure acting on said main valve member.

5. The valve arrangement according to claim 1, wherein said second radial hole is a failsafe hole for controlling a failsafe flow of said damping medium.

6. The valve arrangement according to claim 1, further comprising a second recess in the interface between said main valve member and said control valve member, axially displaced from said first recess towards said first port and extending along the main valve members' inner circumference forming an inner volume for holding a damping fluid, so as to spread pressurized damping fluid flowing between said first and second port around substantially the entire circumference of the control valve member.

7. The valve arrangement according to claim 1, wherein a total orifice area of the first radial holes is at least the same size as, or larger than, the total orifice area of the second radial holes in said control valve member.

8. The valve arrangement according to claim 3, wherein when said control valve member is held against an axial stop the control valve member closes the pilot chamber so as to build up an enclosed pressure in the pilot chamber which holds the main valve member against said main valve seat and thereby blocks the main flow between said first and second ports.

9. The valve arrangement according to claim 8, wherein said enclosed pressure in the pilot chamber further holds the control valve member against said axial stop.

10. The valve arrangement according to claim 3, further comprising a pilot valve member axially movable within said control valve member, said pilot valve member being arranged to interact with a pilot valve seat of said control valve member to restrict a pilot fluid flow out from said pilot chamber.

11. The valve arrangement according to claim 10, wherein said first radial hole is fluidly connected with said second radial hole by means of a recess in the interface between said control valve member and said pilot valve member creating an inner volume for holding damping fluid.

12. A valve arrangement for a shock absorber, said valve arrangement comprising:
    a valve housing comprising a first and a second port;
    a main valve member arranged in said valve housing and having a radial hole; and
    a control valve member being movable in an axial direction relative said main valve member in response to an actuating force acting on said control valve member to restrict a first damping fluid flow between said first and second port,
    wherein said control valve member comprises at least a first radial hole and a second radial hole at an axial distance from each other being fluidly connected to each other and allowing said first flow of said damping fluid between said first and second port via said main valve member's radial hole,
    wherein said main valve member comprises a first recess at the radial inner end of said radial hole along the main valve members' inner circumference forming an outer volume for holding a damping fluid, so as to spread pressurized damping fluid flowing between said first and second port around substantially the entire circumference of the control valve member, and
    wherein said first flow of damping medium is controlled through the axial position of said first radial hole relative an edge of said outer volume so as to restrict the flow when reducing the orifice of said first radial hole,
    wherein said control valve further comprises a third set of radial holes arranged axially between said first and second radial holes so that when said control valve member is in an axial fail safe position the damping fluid is restricted by the orifice area of the second radial hole(s) towards the first port and by the total orifice area of the first and third radial holes towards the second port.

13. The valve arrangement according to claim 12, wherein the total orifice area of the third radial holes is larger than the total orifice area of said first or second radial holes.

14. The valve arrangement according to claim 12, wherein said second radial hole is a failsafe hole for controlling a failsafe flow of said damping medium.

15. The valve arrangement according to claim 12, wherein a total orifice area of the first radial holes is at least the same size as, or larger than, the total orifice area of the second radial holes in said control valve member.

16. A valve arrangement for a shock absorber, said valve arrangement comprising:

a valve housing comprising a first and a second port;

a main valve member arranged in said valve housing and having a radial hole; and a control valve member being movable in an axial direction relative said main valve member in response to an actuating force acting on said control valve member to restrict a first damping fluid flow between said first and second port, wherein said control valve member comprises at least a first radial hole and a second radial hole at an axial distance from each other being fluidly connected to each other and allowing said first flow of said damping fluid between said first and second port via said main valve member 's radial hole, wherein said main valve member comprises a first recess at the radial inner end of said radial hole along the main valve members ' inner circumference forming an outer volume for holding a damping fluid, so as to spread pressurized damping fluid flowing between said first and second port around substantially the entire circumference of the control valve member, and wherein said first flow of damping medium is controlled through the axial position of said first radial hole relative an edge of said outer volume so as to restrict the flow when reducing the orifice of said first radial hole, wherein said control valve further comprises a set of third radial holes arranged axially between said first and second radial holes so that when said control valve member is in an axial active regulating position the damping fluid is restricted by the orifice of the first radial hole(s) towards the second port and by the total orifice of the second and third radial holes towards the first port.

17. The valve arrangement according to claim 16, wherein the total orifice area of the third radial holes is larger than the total orifice area of said first or second radial holes.

18. The valve arrangement according to claim 16, wherein said second radial hole is a failsafe hole for controlling a failsafe flow of said damping medium.

19. The valve arrangement according to claim 16, wherein a total orifice area of the first radial holes is at least the same size as, or larger than, the total orifice area of the second radial holes in said control valve member.

20. The valve arrangement according claim 16, further comprising a second recess in the interface between said main valve member and said control valve member, axially displaced from said first recess towards said first port and extending along the main valve members ' inner circumference forming an inner volume for holding a damping fluid, so as to spread pressurized damping fluid flowing between said first and second port around substantially the entire circumference of the control valve member.

* * * * *